(12) United States Patent
Van De Rovaart

(10) Patent No.: US 7,793,382 B2
(45) Date of Patent: Sep. 14, 2010

(54) WIPER ARM AND COVER FOR A WIPER ARM

(75) Inventor: Robert-Jan Van De Rovaart, Buhl-Neusatz (DE)

(73) Assignee: Robert Bosch GmbH, Stuttgart (DE)

( * ) Notice: Subject to any disclaimer, the term of this patent is extended or adjusted under 35 U.S.C. 154(b) by 1105 days.

(21) Appl. No.: 10/579,870

(22) PCT Filed: Dec. 2, 2004

(86) PCT No.: PCT/EP2004/053221

§ 371 (c)(1),
(2), (4) Date: May 18, 2006

(87) PCT Pub. No.: WO2005/054017

PCT Pub. Date: Jun. 16, 2005

(65) Prior Publication Data

US 2007/0136975 A1     Jun. 21, 2007

(30) Foreign Application Priority Data

Dec. 5, 2003 (DE) .................................. 103 56 918

(51) Int. Cl.
*B60S 1/34* (2006.01)
(52) U.S. Cl. .................................................. 15/250.34
(58) Field of Classification Search .............. 15/250.31, 15/250.351, 350.352, 350.34
See application file for complete search history.

(56) References Cited

U.S. PATENT DOCUMENTS

| 2,860,364 A | * | 11/1958 | Krohm | 15/250.34 |
| 2,860,365 A | * | 11/1958 | Krohm | 15/250.352 |
| 2,964,775 A | * | 12/1960 | Krohm | 15/250.34 |
| 2,980,453 A | * | 4/1961 | Nesson | 403/298 |
| 3,126,216 A | * | 3/1964 | Krohm | 403/300 |
| 3,800,356 A | * | 4/1974 | Ito | 15/250.34 |
| 4,318,201 A | * | 3/1982 | Rogers et al. | 15/250.352 |
| 4,502,178 A | * | 3/1985 | Ragot et al. | 15/250.34 |
| 6,581,238 B1 | * | 6/2003 | Sevellec | 15/250.351 |
| 2002/0144373 A1 | * | 10/2002 | Muramatsu | 15/250.352 |
| 2002/0152575 A1 | | 10/2002 | Tsukamoto et al. | |

FOREIGN PATENT DOCUMENTS

| DE | 3428795 | * | 2/1985 |
| DE | 4128705 | * | 4/1992 |
| DE | 4333554 | * | 10/1994 |
| DE | 19653033 | * | 6/1998 |
| DE | 199 38 969 | | 2/2001 |
| EP | 628457 | * | 12/1994 |
| FR | 2607766 | * | 10/1988 |
| JP | 5-305859 | * | 11/1993 |
| JP | 8-72676 | * | 3/1996 |

(Continued)

*Primary Examiner*—Mark Spisich
(74) *Attorney, Agent, or Firm*—Michael Best & Friedrich LLP

(57) ABSTRACT

The invention provides for a wiper arm for a windshield wiper system comprising a fixing element (12) for connection to a drive shaft, whereby a tiltably-fixed cover unit (24) is provided for at least partially releasing the fixing element (12). It is proposed that the cover unit (24) can be engaged with the fixing element (12) in the tilted position. A cover unit for a wiper arm is also proposed.

14 Claims, 3 Drawing Sheets

FOREIGN PATENT DOCUMENTS

| | | | |
|---|---|---|---|
| JP | 8-133023 | * | 5/1996 |
| JP | 2001-247015 | | 9/2001 |
| JP | 2001247015 A | | 9/2001 |
| JP | 2001301580 A | | 10/2001 |
| JP | 2002-2455 | * | 1/2002 |
| JP | 2003-2172 | * | 1/2003 |
| JP | 2003-11787 | * | 1/2003 |
| JP | 2003002171 A | | 1/2003 |

* cited by examiner

WIPER ARM AND COVER FOR A WIPER ARM

BACKGROUND OF THE INVENTION

The invention starts with a wiper arm, as well as a cover unit for a wiper arm.

Wiper systems with one or more windshield wipers for motor vehicles are fastened directly or indirectly with their wiper bearings via a mounting plate to the body of the motor vehicle. A motor shaft of a wiper motor directly or indirectly drives, for example via a rod, cranks, which are permanently connected with one end of a drive shaft for each windshield wiper. The drive shaft or the bearing axis is positioned in a wiper bearing. Provided in the bearing housing is at least one radial bearing and one axial bearing on the front sides between the bearing housing and a part that is permanently connected to the drive shaft. The drive shaft projects from the body and moves a wiper arm, which is fastened to its free end and has a wiper blade, over a windshield. As a rule, the wiper arm has a fixing element that is connected in a rotationally secured manner to the drive shaft, and this fixing element is connected in an articulated manner with an articulation part, on which a wiper rod is rigidly attached. This type of wiper system is known from DE 199 38 969 A1 for example. In the case of known wiper systems, the fixing element is covered at least partially with a capsule-shaped cover unit, which can be tilted in order to release the drive shaft for screwing the wiper arm on the drive shaft.

SUMMARY OF THE INVENTION

It is proposed in the case of a wiper arm in accordance with the invention that a cover unit in the tilted position can be engaged with a fixing element of the wiper arm. As a result, the cover unit can be put in a defined position, in which a worker can fasten the wiper arm to a drive shaft through the cover unit without being impeded, preferably by screwing on a front side of the drive shaft. The wiper arm can be mounted ergonomically and securely. Normally, the cover unit is already fastened to the wiper arm, if it is supposed to be mounted to a motor vehicle. The engagement is essentially provided for one-time use during mounting of the wiper arm; as a result, low requirements for stability of the engagement are adequate. The cover unit can therefore be manufactured cost effectively. The engagement between the cover unit and the fixing element can preferably be achieved by a positive engagement or even by locking into place in an undercut.

A particularly simple engagement is possible if the cover unit has an inwardly projecting rib on an inner side of at least one lateral wing. It is beneficial if an inwardly projecting rib is provided on the inner sides of both lateral wings. The lateral wings grip over the fixing element of the wiper arm at least partially.

If the rib is arranged in such a way that the rib can run at least along a contour of the fixing element when tilting the cover unit, the cover unit can be tilted freely until the rib engages. The cover unit is expediently tilted by approx. 90°. After going beyond a fixing point of the contour, a positive engagement can be produced between the rib and the contour or fixing element. The rib can then be adjacent in a positively engaged manner with the contour. The fixing point can be a formation of the contour, which prevents the rib from gliding over it freely. The rib cannot go beyond the fixing point on its own and therefore cannot tilt back if it has passed this point in the direction of an end position. The rib remains securely in place in the tilted position. A free passage for the assembly of the wiper arm on the drive shaft is guaranteed. Alternatively, an undercut can be provided on the contour into which the cover position hooks when tilting in its end position and which also prevents an undefined tilting back. The cover unit is secured during mounting of the wiper arm and undefined tilting back into its initial position is reliably prevented. Damage to the cover unit from tilting back is prevented.

If at least one nose for hooking on the fixing element is provided on the inner side of at least of one lateral surface of the cover unit, the cover unit can be tilted back simply after the worker mounts the wiper arm and can be securely and solidly locked by hooking the nose. The fixing element advantageously has a crosspiece corresponding to the nose, which the nose can grip under for fastening the cover unit.

Moreover, a cover unit for at least partially covering a wiper arm for a windshield wiper system is proposed, in which an inwardly pointing rib is provided on at least one of its lateral wings, which rib can produce an engagement with the fixing element of the wiper arm. The cover unit is preferably embodied to be capsule-shaped. The cover unit can be manufactured simply and cost effectively. The rib is provided essentially for one-time use during mounting of the wiper arm, a fact that makes the design and manufacture of the cover unit cost effective.

A reliable connection for long-term use on a wiper arm is possible if the at least one lateral wing has a nose on its inner side for hooking on the fixing element.

If both lateral wings each have a rib, the cover unit can be held stably in its tilted position for mounting the wiper arm.

The cover unit is preferably embodied of a glass fiber reinforced plastic.

BRIEF DESCRIPTION OF THE DRAWINGS

The invention will be described in greater detail in the following in an exemplary embodiment on the basis of the associated drawings. The drawings show.

DETAILED DESCRIPTION

The same reference numbers are used for the same parts in the figures.

Figure 1:
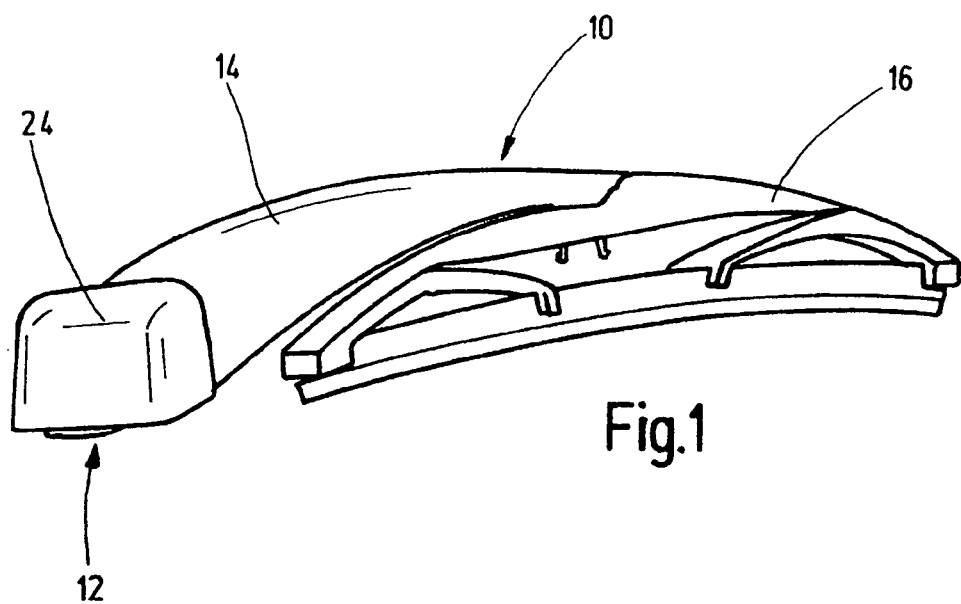
FIG. 1 A view of a wiper arm with a cover unit and a wiper blade unit

FIG. 1 shows a diagonal view of a wiper arm 10 with a wiper blade unit 16. The wiper arm 10 has a fixing element 12, which is connected in an articulated manner with an articulated arm 14. The articulated arm 14 can include an articulated part and a rigidly attached wiper rod or be embodied as a single piece, preferably made of plastic. The wiper blade unit 16 is suspended on one end of the articulated arm 14. The fixing element 12 is attached on the opposite end. The fixing element 12 has a bearing location on one end, which can be used to connect (e.g., to screw on via a bore hole) the fixing element 12 in a rotationally secured manner to the drive shaft via a fixing means on a drive shaft projecting from a vehicle body. Alternatively, other suitable fastening types can be selected.

Figure 2:
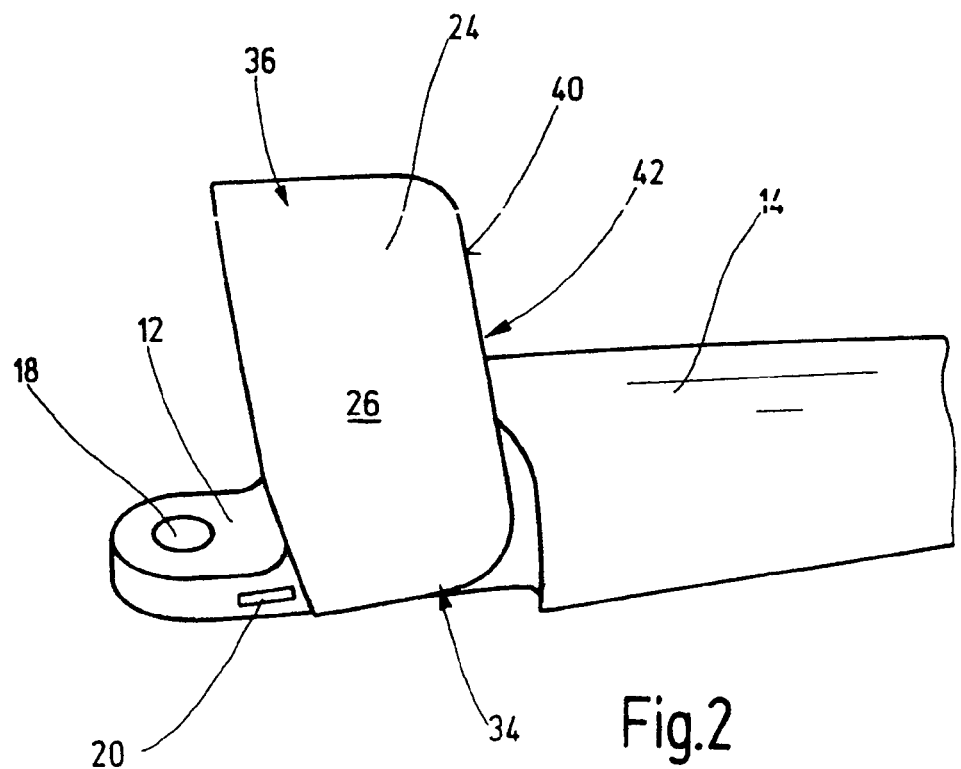
FIG. 2 A detail of the arrangement from FIG. 1 with a tilted cover unit in the assembly position FIG. 3 A diagonal view of a cover unit FIG. 4 A view of an inner surface of the cover unit from FIG. 3

The fixing element 12 is covered at least in the area of the connection to the drive shaft by the tiltably-fixed cover unit 24 for freeing the bore hole. The cover unit 24 is embodied to be capsule-shaped. In order to connect the wiper arm 10 to the drive shaft, the cover unit 24 is tilted approx. 90° forward in the direction of the articulated arm 14 and secured, as shown in FIG. 2. As a result, a bore hole 18 is freed, via which the wiper arm 10 can be fastened to a drive shaft. In a tilted position, the cover unit 24 can be engaged with the fixing element 12. Attached on a lateral surface of the fixing element 12 is a crosspiece 20, on which the cover unit 24, which is tilted back into its initial position again after assembly, can be hooked in order to fasten this enduringly on the fixing element 12. Such a crosspiece 20 is provided expediently on both lateral surfaces of the fixing element 12. The cover unit 24 has an opening 42 on its upper side 40, into which a finger of the articulated arm 14 projects.

Figure 3:
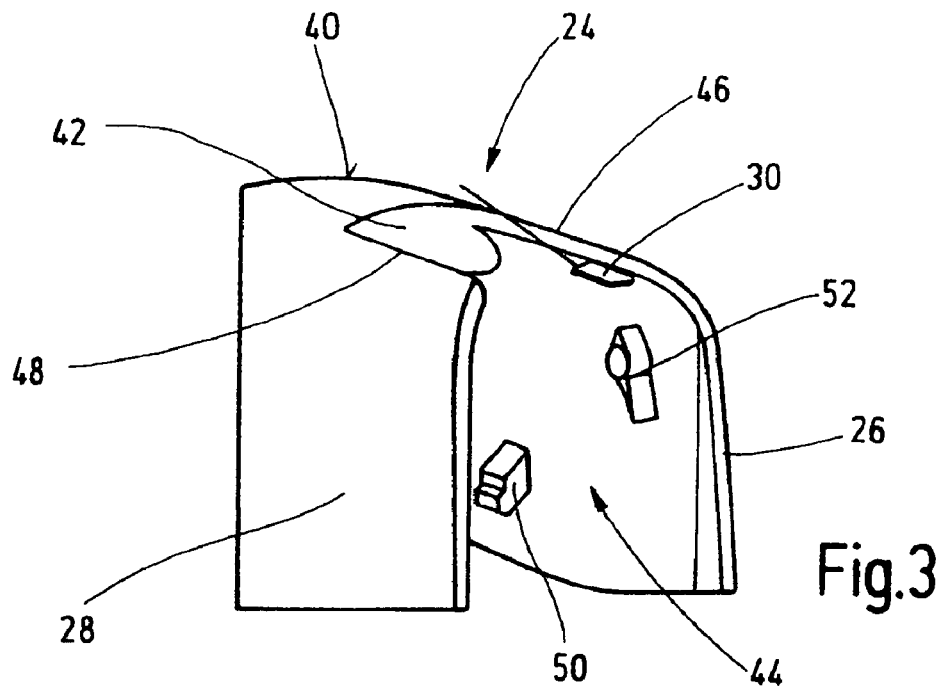

FIG. 3 shows a diagonal view of a cover unit 24. It is capsule-shaped, embodied approximately in a U-shaped manner with two lateral wings 26, 28 that are open to the front towards a front side 34 and are connected via a closed rear side 36. The contours of the lateral wings 26, 28 on the front side 34 are adapted to the contour of the articulated arm 14 so that the cover unit 24 can be tilted. An opening 42 starting from the front side 34 is embedded in the cover unit's upper side 40, which corresponds with a finger of the articulated arm 14 projecting into the opening 42 (FIG. 2). The opening 42 is limited on each of the longitudinal sides of the cover unit 24 by a leg 46, 48. If the cover unit 24 is tilted to mount the wiper arm 10, the opening 42 offers space for the finger of the articulated arm 14.

Furthermore, an inner surface of the lateral wing 26 of the cover unit 24 is recognizable. Adjacent to the leg 46 and away from the upper side 40, an inwardly pointing rib 30 extends approximately parallel to the leg 46 and this rib forms a locking means to engage the cover unit 24. Beneath the rib 30, the lateral wing 26 features a rotational support 52 on its inner side, which can be connected with a corresponding holder on the fixing element 12. The cover unit 24 is tilted around a rotational axis around this rotational support 52. The inner surface of the opposite lateral surface is structured symmetrically and has a corresponding rib and rotational support (not shown). A nose 50 is arranged in a lower area on the inner surface of the lateral wing 26, which can hook on a crosspiece 20 of the fixing element 12 (FIG. 2), in order to connect the cover unit 24 as stably and enduringly as possible to the fixing element 12 after the wiper arm 10 is mounted.

Figure 4:
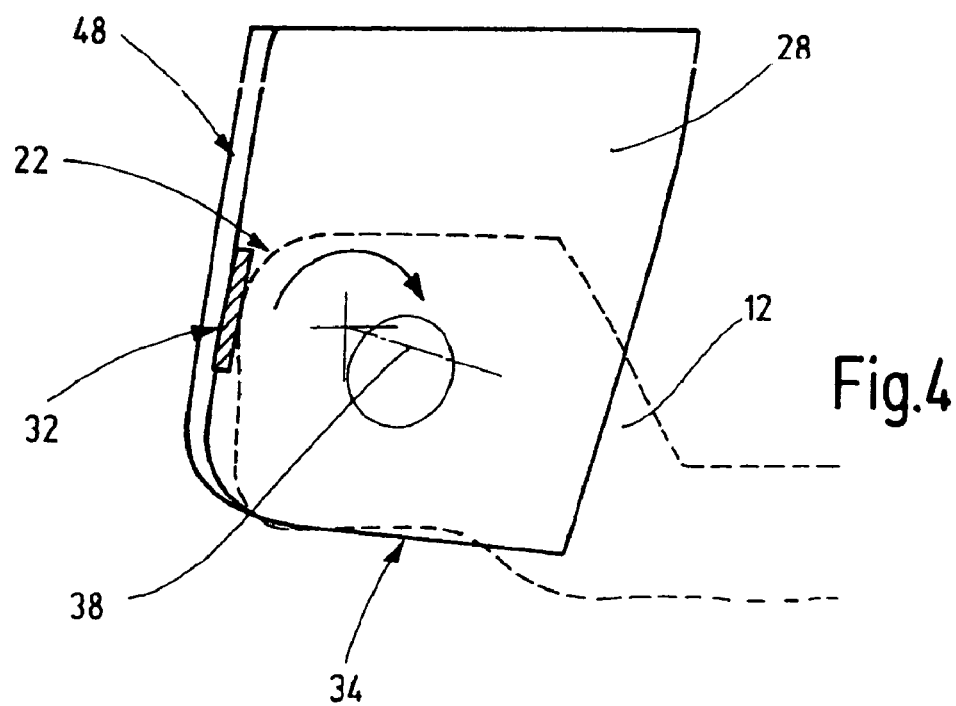

FIG. 4 illustrates how a rib 32 of the lateral wing 28 can run along a contour 22 of a fixing element 12 when tilting the cover unit 24 around a rotational axis 38 of a rotational support (not shown). The rib 32 is arranged adjacent to a leg 48 in the area of the upper side 40 of the cover unit 24 parallel to the leg 48. After going beyond a fixing point of the contour 22, a positive engagement can be produced between the rib 32 and the contour 22. The fixing element 12 is indicated as a dashed line for the sake of clarity. The fixing point prevents free movement of the cover unit 24. After assembly is complete, the cover unit 24 is tilted back in the direction of the arrow. In the process, the fixing point of the contour 22 must be overcome with some application of force.

Figure 5:
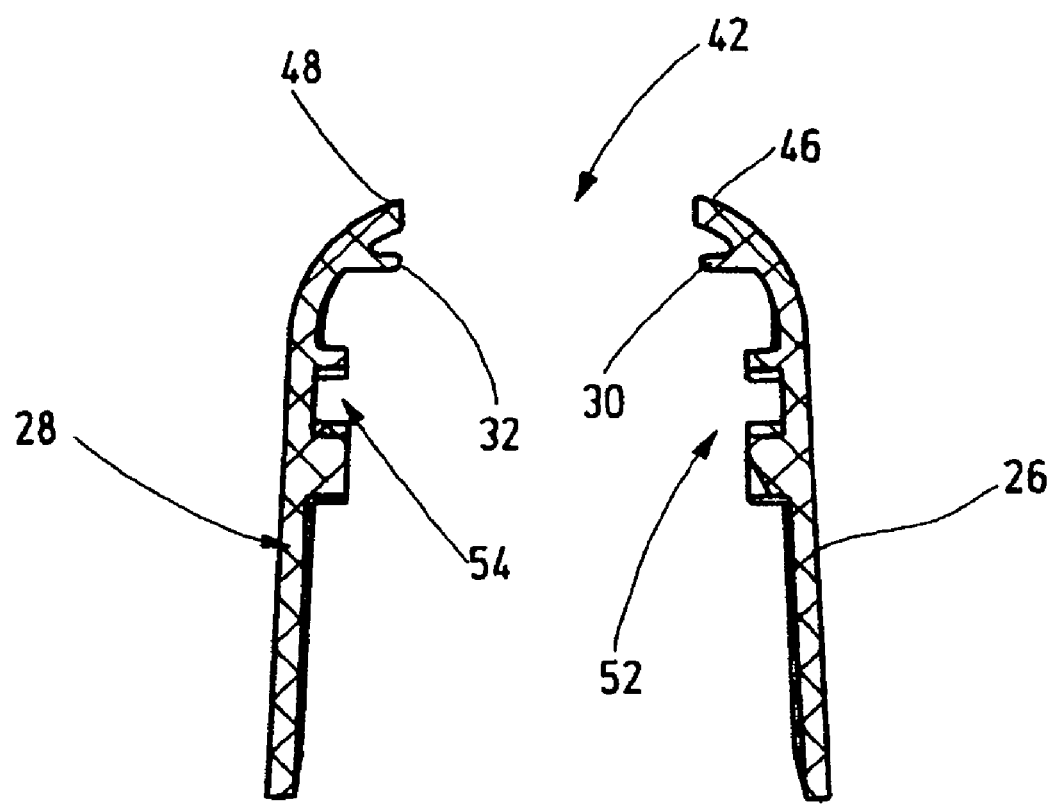
FIG. 5 A cross section through a cover unit

FIG. 5 shows a cross section through the cover unit 24 through an area with ribs 30, 32 and rotational supports 52, 54. A first and second lateral wing 26, 28 form a U-shaped contour in cross section, which features an opening 42 in the apex, which is limited by legs 46 and 48. Ribs 30, 32 are arranged along the contour in the direction of the rotational supports 52, 54 on the respective inner sides of the lateral wings 26, 28 between the legs 46 and 48 and the rotational supports 52, 54. The cover unit 24 is embodied preferably of plastic, especially preferably of a glass fiber reinforced plastic.

The invention claimed is:

1. Wiper arm (10) for a window wiper system, with a fastening part (12) for connection to a drive shaft, wherein a tiltably fastened cover unit (24) having a top side (40) and two side wings (26, 28) which are open to a front side (34) and are connected via a closed rear side (36) is provided for at least partially releasing the fastening part (12), and the cover unit (24) can be latched in the tilted state to the fastening part (12), characterized in that, on an inner side of at least one side wing (26, 28), the cover unit (24) has an inwardly projecting rib (30, 32) elongated in a direction generally aligned with the top side for latching of the cover unit (24) in the tilted state, the rib (30, 32) being spaced from a rotary support (52, 54) of the cover unit (24) and where it is further located between the rotary support (52, 54) and the top side (40) and, upon tilting of the cover unit (24), can be guided at least partially along a curved outer contour (22) of the fastening part (12).

2. Wiper arm according to claim 1, characterized in that a positive engagement can be produced between the rib (30, 32) and fastening part (12).

3. Wiper arm according to claim 2, characterized in that at least one nose (50) for hooking on the fastening part (12) is provided on the inner side of at least one side surface of the cover unit (24).

4. Wiper arm according to claim 3, characterized in that the fastening part (12) has a crosspiece (20) which corresponds to the nose (50) and can be engaged by the nose (50) in order to fasten the cover unit (24).

5. Wiper arm according to claim 1, characterized in that at least one nose (50) for hooking on the fastening part (12) is provided on the inner side of at least one side surface of the cover unit (24).

6. Wiper arm according to claim 5, characterized in that the fastening part (12) has a crosspiece (20) which corresponds to the nose (50) and can be engaged by the nose (50) in order to fasten the cover unit (24).

7. Cover unit (24) for at least partially covering a wiper arm (10) for a window wiper system, with a top side and two side wings (26, 28) which are open towards a front side (34) and are connected via a closed rear side (36), characterized in that an inwardly pointing rib (30, 32) elongated in a direction generally aligned with the top side is provided on at least one of the side wings (26, 28), which rib can be used, in a tilted state, to produce a latching connection to a fastening part (12), the rib (30, 32) being spaced from a rotary support (52, 54) of the cover unit (24) and where it is further located between the rotary support (52, 54) and the top side (40) and, upon tilting of the cover unit (24), being guided at least partially along a curved outer contour (22) of the fastening part (12).

8. Cover unit according to claim 7, characterized in that the inner side of the at least one side wing (26, 28) has a nose (50) for hooking on the fastening part (12).

9. Cover unit according to claim 8, characterized in that both side wings (26, 28) have a respective rib (30, 32).

10. Cover unit according to claim 9, characterized in that it is formed from a glass fiber reinforced plastic.

11. Cover unit according to claim 8, characterized in that it is formed from a glass fiber reinforced plastic.

12. Cover unit according to claim 7, characterized in that both side wings (26, 28) have a respective rib (30, 32).

13. Cover unit according to claim 12, characterized in that it is formed from a glass fiber reinforced plastic.

14. Cover unit according to claim 7, characterized in that it is formed from a glass fiber reinforced plastic.

* * * * *